June 4, 1935.  H. A. GEHRES  2,003,485
EXHAUST MANIFOLD AND CONNECTION
Filed July 11, 1931
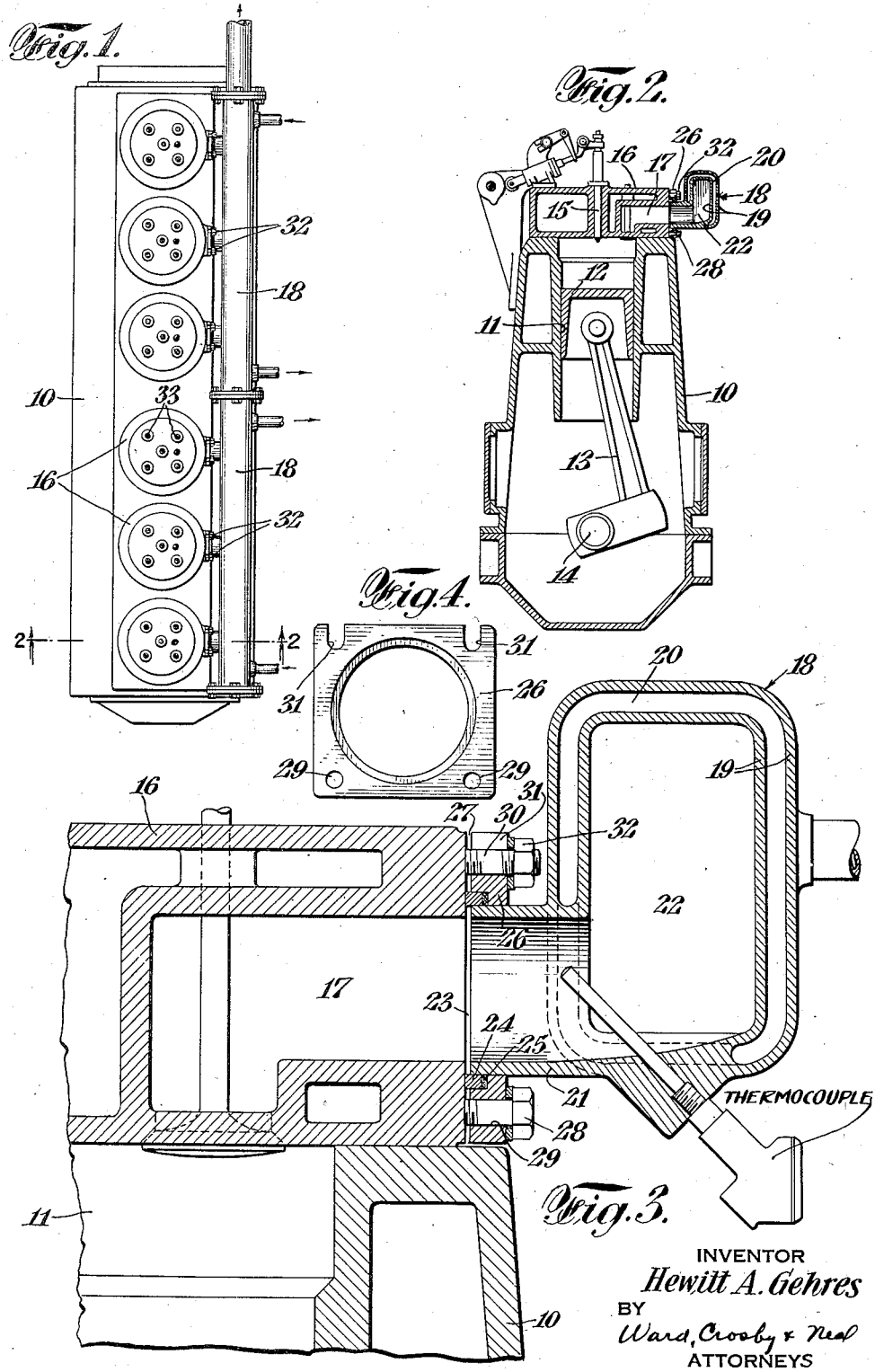
INVENTOR
Hewitt A. Gehres
BY
Ward, Crosby & Neal
ATTORNEYS Patented June 4, 1935

2,003,485

UNITED STATES PATENT OFFICE 2,003,485

EXHAUST MANIFOLD AND CONNECTION

Hewitt A. Gehres, Mount Vernon, Ohio, assignor to Cooper-Bessemer Corporation, Mount Vernon, Ohio, a corporation of Ohio Application July 11, 1931, Serial No. 550,067

4 Claims. (Cl. 123—195)

This invention relates to improvements in exhaust manifolds and their connection with cylinder heads.

One of the objects of this invention is the provision of an exhaust manifold which avoids the necessity of the use of the ordinary elbow connections with the cylinder heads and a special cooling system for such connection.

Another object is the provision of an effective sealing connection between a common exhaust manifold and cylinder heads which connection, when released, permits of the removal of individual cylinder heads without disturbing any part of the manifold or injury to the packing joint.

Still another object of this invention is the provision of a manifold and packing joint for sealing the connection between the manifold and exhaust orifice in a cylinder head, which permits of locating the manifold closely adjacent to cylinder head for the purpose of saving space and/or avoiding the necessity for a special cooling system for the usual elbow connection, while at the same time facilitating removal of the cylinder head without disturbance of the exhaust manifold or injury to the packing joint.

Other objects will be apparent from the following description taken in connection with the drawing, in which Fig. 1 is a top plan view of a multi-cylinder engine to which my invention may be applied;

Fig. 2 is a transverse vertical section on the line 2—2 of Fig. 1;

Fig. 3 is an enlarged detail view of the upper portion of Fig. 2; and

Fig. 4 is a face view of the gland ring looking toward the right in Fig. 3.

Heretofore, elbow connections were provided to connect the exhaust ports of the cylinder heads to the exhaust manifold. The elbows necessitated spacing the exhaust manifold farther from the cylinder heads than was desirable for installation in close quarters, and, moreover, when the engines were installed in close quarters in boats the elbows had to be water cooled. The elbows could not be made big enough to accommodate the entire discharge of the cooling fluid from the cylinder heads, thus necessitating the installation of a separate circulation system.

In accordance with the present invention, the use of elbow connections is avoided by providing the manifold with short extensions which permit the manifold to be located close to the cylinder heads, the extensions being so short that there is no necessity for circulation ducts other than those in the manifold proper.

The drawing for purposes of illustration shows an engine casting 10 provided with a plurality of cylinders 11 in each of which operates the usual piston 12 connected by a piston rod 13 to the crank shaft 14. Liquid fuel may be injected through the nozzle 15 mounted in the cylinder head 16 provided with an exhaust port 17 opening outwardly on the side of the head.

The main body of the exhaust manifold indicated at 18 may be of any cross sectional shape but is preferably of rectangular shape, as shown, to bring the outer face of the manifold as close to the cylinder head as possible for the purpose of conserving space. The manifold 18 is preferably double-walled, as at 19, providing a water cooling circulation chamber 20 which may be substantially unbroken longitudinally of the manifold except at the extensions 21, through which the gases exhausted through the ports 17 in the cylinder heads are carried into the exhaust chamber 22 of the exhaust manifold. The extensions 21 are made very short so as to locate the manifold 18 as close to the cylinder heads 16 as possible, and also to avoid the necessity of being provided with cooling ducts which, if used, would necessitate the use of a separate cooling system.

The ends of the extensions are formed or fitted with a clearance fit with respect to the cylinder heads when the cylinder heads and manifold are in position, as indicated at 23, in Fig. 3. This clearance is sealed by a sealing ring 24 and a packing ring 25, the sealing ring being pressed into sealing contact with the outer face of the cylinder head 16 and the end of the extension 21, by means of a gland ring 26, the size and construction of the rings being such, as indicated by the clearance 27 between the gland ring 26 and the cylinder head 16, that the joint between the extension 21 and cylinder head 16 may be tightly sealed after wear or compression of the packing elements and to take care of variations in clearances 23 between the extensions 21 and heads 16.

The gland ring 26 is drawn toward the cylinder head 16 by means of a pair of tap bolts 28 extending through holes 29 in the lower portion of the gland ring, and threaded into the cylinder head, and by a pair of stud bolts 30 extending through open ended slots 31 in the upper part of the gland ring 26 and threaded into the cylinder head 16. The stud bolts are provided with nuts 32 as shown. By advancing the nuts 32 and the tap bolts 28, an effective seal tight joint between the extensions 21 and cylinder heads 16 may be effected.

When it is desired to remove any one of the cylinder heads 16, the corresponding tap bolts 28 are removed and the nuts 32 are backed off from the stud bolts 30, which permits the gland ring and the packing and sealing rings to be moved away from the cylinder head, which may then be removed, after having been disconnected from the engine casting, directly vertically without injury to the packing joint or necessitating disturbing the manifold. The cylinder heads may be secured to the engine casting by compression rods or the like 33 as usual.

While the invention has been described with particularity as to the embodiment illustrated for the purpose of disclosing the principle of this invention, it is to be understood that words of description imported into the claims are to be considered as words of description and not of limitation, and that it is the intention to cover in the claims all equivalent forms.

What I claim is:

1. The combination with an engine casting, a plurality of engine cylinders, a head for each cylinder, means for individually removably securing each head to its cylinder for vertical removal and replacement, each head being provided with an exhaust port opening on one of its lateral sides, a common exhaust manifold, short hollow extensions on said manifold extending toward said heads with a clearance fit and connecting said exhaust ports to the chamber of the manifold, packing means for the joint between the extensions and exhaust ports including a gland ring, tap bolts for drawing the lower section of each ring to the corresponding cylinder head, studs on each cylinder head projecting through upwardly opening slots in the upper section of said rings and threaded at their free ends, and nuts threaded on said studs for drawing the upper section of said rings toward the cylinder heads.

2. In an engine, the combination of a plurality of engine cylinders rigidly connected together, an individually removable cylinder head for each cylinder removable therefrom in the direction of the length of the cylinder and provided with an exhaust port opening through its side face, a common manifold for said plurality of cylinders located close to said cylinder heads and provided with short extensions the ends of which are fitted with a clearance fit to the side faces of said cylinder heads in line with the exhaust ports therein, and means for sealing the space between the ends of said extensions and the side walls of said cylinder heads, said sealing means being releasable to provide for removal of any one of said cylinder heads without disturbing the exhaust manifold.

3. The combination with an engine casting, a plurality of engine cylinders, a head for each cylinder, means for securing said heads to said cylinders and providing for movement of said heads axially of said cylinders during mounting and dismounting thereof, each head being provided with a vertically extending side face through which opens the exhaust port, a common manifold of elongated transverse section with its longer diameter extending vertically and provided with short integral extensions having a clearance fit with the side walls of said heads whereby the cylinder heads may be removed and replaced without dismounting or disturbing the common manifold, and sealing means for sealing the joint between the ends of the extensions and the side faces of the cylinder heads.

4. In an engine construction for installation in close quarters comprising a plurality of vertically extending cylinders, a cylinder head for each cylinder provided with a laterally opening exhaust port, a common exhaust manifold of greater vertical than lateral dimension and closely spaced with respect to said cylinder heads, connections between said exhaust manifold and said cylinder heads for conducting gases from said ports to the chamber in said exhaust manifold, said connections having a clearance fit with the side walls of said cylinder heads and cylinder, and means for sealing the joints between said connections and said cylinder heads constructed to facilitate the use of short connections whereby the common exhaust manifold may be closely spaced with respect to said cylinder heads.

HEWITT A. GEHRES.